Václav Pech, Jan Vebr,
Richard Spůra
INVENTORS

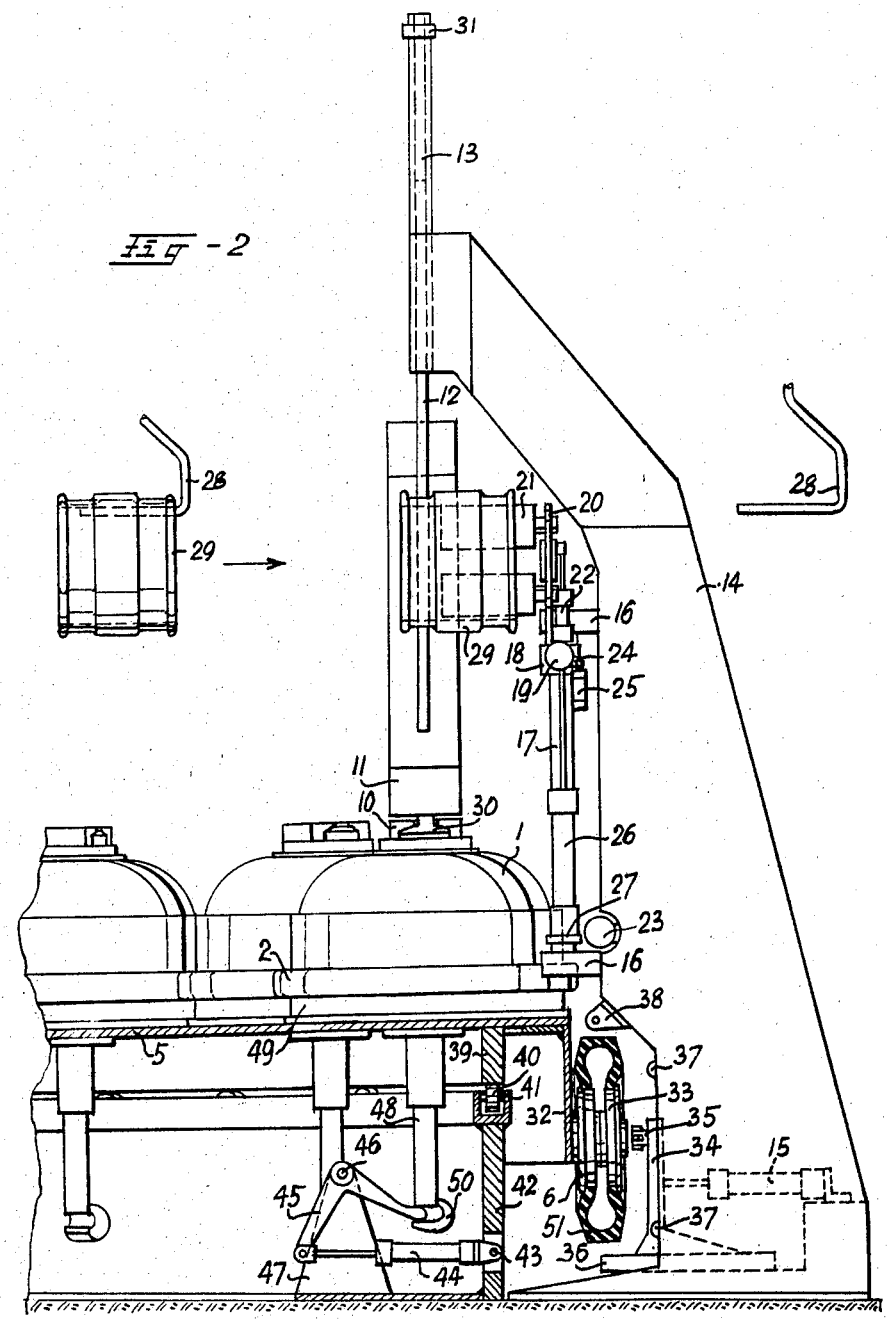

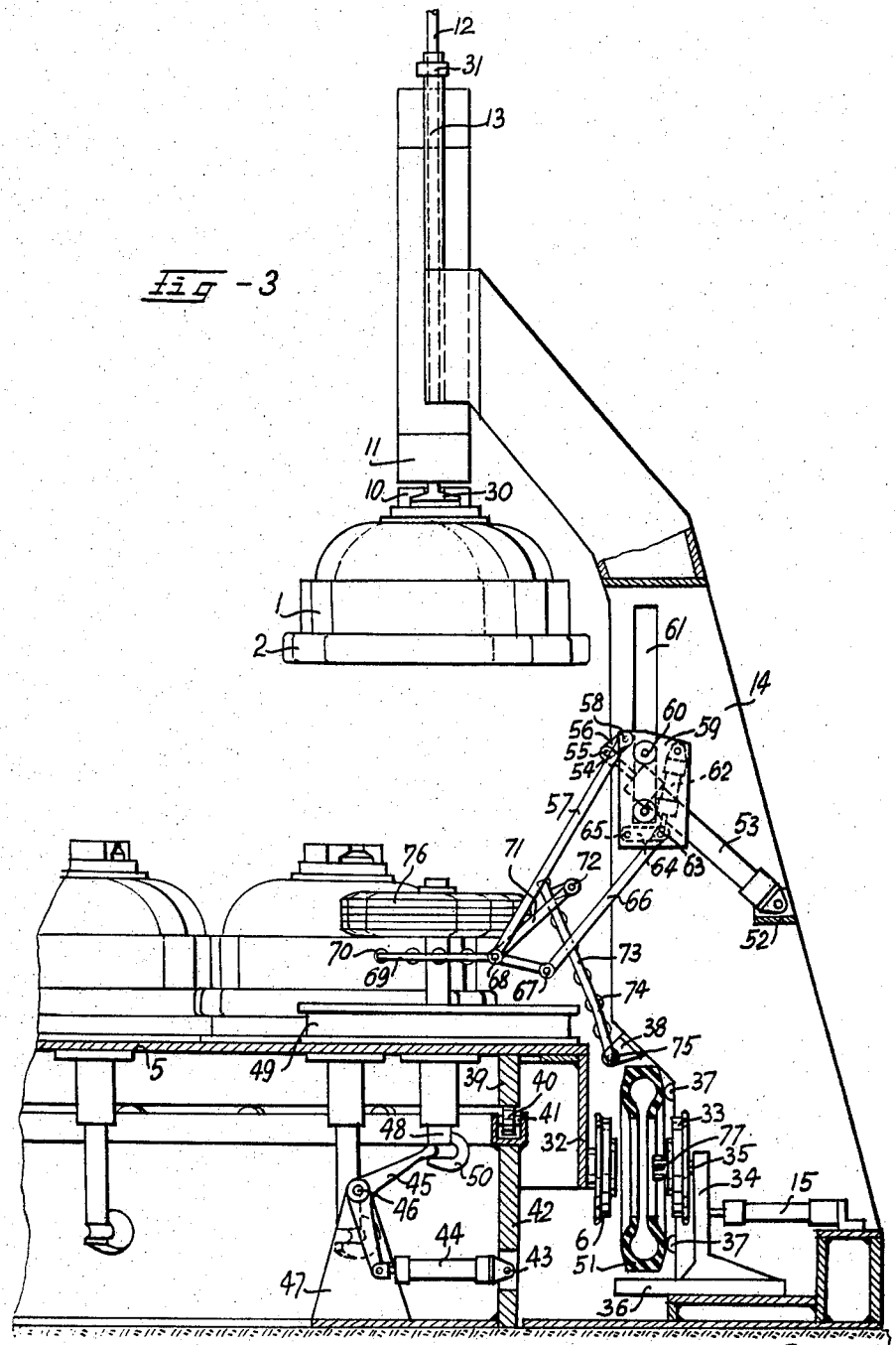

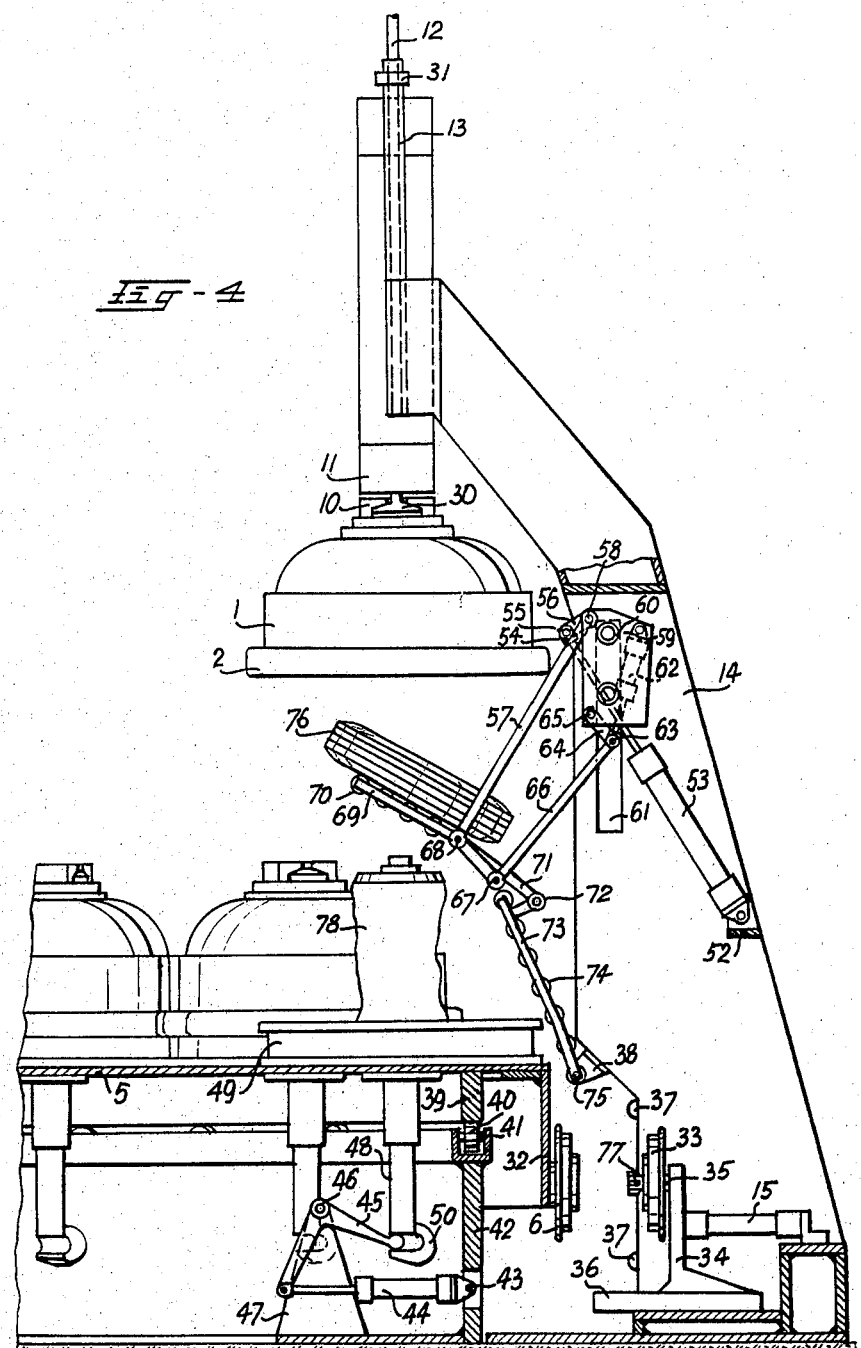

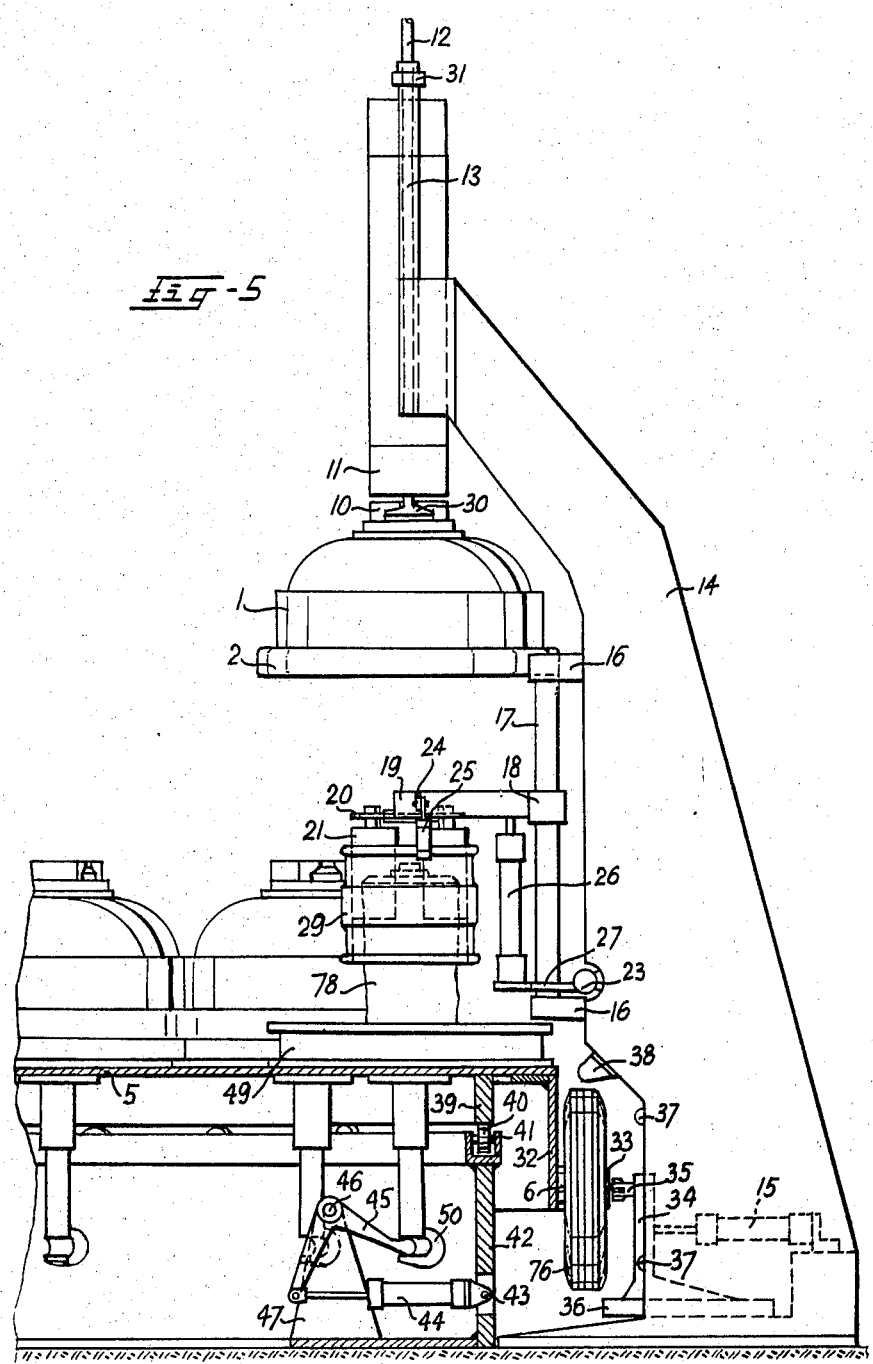

United States Patent Office 3,477,100
Patented Nov. 11, 1969

3,477,100
VULCANIZING PRESSES
Václav Pech, Jan Vebr, and Richard Spura, Chodov, Czechoslovakia, assignors to Chepos Zavody Chemickeho a Potrovinarskeho Strojirenstvi, oborovy Podnik, Brno, Czechoslovakia
Filed Aug. 31, 1966, Ser. No. 576,416
Claims priority, application Czechoslovakia, Sept. 2, 1965, 5,387/65
Int. Cl. B29h 5/02
U.S. Cl. 18—17   8 Claims

ABSTRACT OF THE DISCLOSURE

Vulcanizing chambers for automobile tires circumferentially distributed on a horizontal turntable are opened at an operator's station, charged with the pre-assembled uncured tire components, and closed, and the enclosed tire components are vulcanized under heat and pressure while the chambers travel about the circumference of the turntable. The vulcanized tires are discharged into a stabilizing device mounted on the turntable, in which they are inflated while cooling during another turn of the table.

---

This invention relates to vulcanizing presses and more particularly to presses for vulcanizing automobile tires.

Known vulcanizing plants have multiple vulcanizing chambers which are individually supplied with electric power, steam, water, and compressed air. Because there is no effective synchronization between the operation of the several chambers, the supply systems must be designed for peak loads because all chambers may have to be supplied simultaneously.

This shortcoming is partly overcome in another known arrangement in which several tire molds are mounted on a common rotary support and move sequentially through several stationary heating chambers consisting of covers which are moved away from each other to admit and release the moving molds. The molds are heated only when enclosed in the chambers. The heat losses during transfer of the molds and during the opening of the chambers unfavorably affect the economy of operation.

The present invention overcomes the shortcomings of the known vulcanizing arrangements by mounting the vulcanizing chambers containing the molds on a turntable in circumferentially offset relationship. The chambers, which rotate with the turntable about a vertically extending axis, are heated while containing the tire components, and are opened at an operating station fixedly arranged near the turntable circumference, the mold parts being fastened to the chamber sections so that the mold is opened together with the chamber for removal of the vulcanized tire and insertion of an uncured tire assembly.

Other features and the attendant advantages of this invention will readily be appreciated from the following detailed description of a preferred embodiment when considered in connection with the appended drawings in which:

FIG. 2 is a fragmentary elevational and partly sectional view of the apparatus of FIG. 1 on a larger scale; and FIGS. 3 to 5 show the apparatus of FIG. 1 in views similar to that of FIG. 2 in different operating positions.

Figure 1:
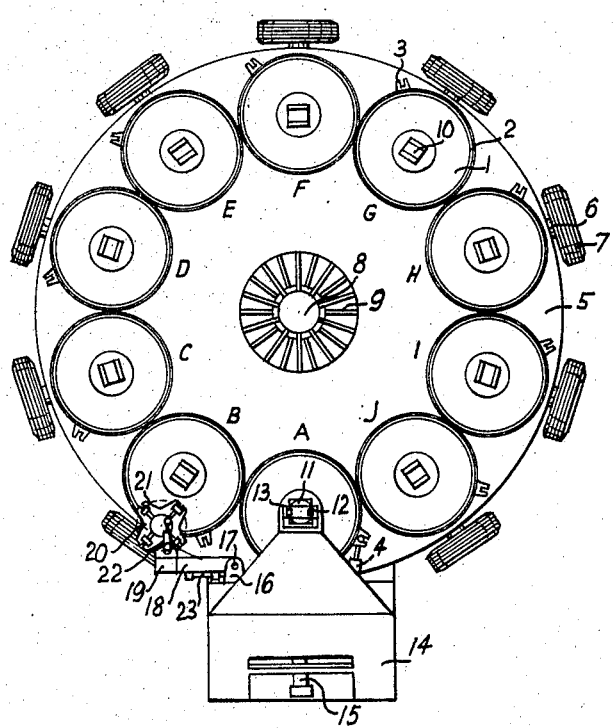
FIG. 1 shows a tire vulcanizing apparatus of the invention in plan view.

Referring initially to FIG. 1, there are seen the cup-shaped top sections 1 of ten tire vulcanizing chambers held in the closed condition by means of bayonet-type closures 2 on their rims. Forked lugs 3 on the chamber rims can be engaged by a stationary pressure-fluid operated actuator 4 for opening and closing the chambers. The latter move past the operating station of the apparatus at the actuator 4 on a horizontal turntable 5 on which they are circumferentially distributed.

A stabilizing disc 6 is radially aligned on the turntable 5 with each vulcanizing chamber and holds a vulcanized tire 7 undergoing a stabilizing treatment.

The vulcanizing chambers and other operating elements of the apparatus are provided with working fluids from a distributing system 8 centered in table 5 through tubes 9 which also drain the fluids.

A dovetail-shaped shoe 10 at the top of each chamber section 1 can be engaged by a fluid-operated lifting device 11 at the afore-mentioned operating station. As is better seen in FIGS. 2 to 5, the cylinder of the lifting device is provided with guide rods 12 which movably engage guides 13 on an upright stationary column 14. In the view of FIG. 1, the column 14 largely obscures a stabilizing device of which only a fluid-operated actuator 15 is seen.

A bracket 16 on the column 14 pivotally supports an upright carrier bar 17 on which a horizontal arm 18 is vertically movable. The free end 19 of the arm 18 carries a plate 20 which may be tilted about the arm 18 and is equipped with the jaws 21 of a chuck opened and closed by means of a cylinder 22. A similar cylinder 23 permits the bar 17 to be turned about its vertical axis.

Most of the elements described above with reference to FIG. 1 are also seen in FIG. 2. There is additionally shown an arm 24 connecting the plate 20 to a fluid-operated cylinder 25 which tilts the plate. A cylinder 26 is mounted on the bar 17 by means of a bracket 27 for raising and lowering the arm 18, the aforementioned cylinder 23 also being mounted on the bracket 27.

The operating station is provided with uncured, assembled tire components 29 by an overhead conveyor of which only two hooks 28 are seen in FIG. 2.

A foot 30 on the bottom end of the cylinder in the lifting device 11 is shaped for conforming engagement with the shoes 10. The free end of the associated piston rod is attached to the column 14 by means of a cross bar 31 fastened to the guides 13.

The stabilizing discs 6 are fixedly attached to the turntable 5 in an upright position by brackets 32. The discs 6 cooperate with movable discs 33. The latter can be moved toward and away from the discs 6 on a slide 34 to which they may be releasably attached by a coupling 35. The slide 34 is moved by the afore-mentioned actuator 15 in a guideway 36 on the column 14 which is provided with vertically spaced abutments 37 opposite the disc 6 the purpose of which will presently become apparent together with that of a bracket 38 on the column 14 approximately above the disc 6.

A circular track 39 on the underside of the turntable 5 travels on rollers 40 whose shafts 41 are secured in the stationary supporting frame 42 of the turntable. A pivot pin 43 on the frame 42 holds a fluid-operated cylinder 44. The associated piston is hinged to a bellcrank lever 45 fulcrumed at 46 to a stationary bracket 47 at the operating station of the vulcanizing apparatus. The lever 45 is positioned to engage a hook 50 on the diaphragm operating mechanism 48 which depends from the bottom section 49 of each vulcanizing chamber.

A stabilized tire 51 is clamped between the discs 6 and 33 to the turntable 5 in the position of the apparatus illustrated in FIG. 2 in which the vulcanizing chamber 1, 49 and the enclosed mold are closed.

In FIG. 3, the top 1 of the vulcanizing chamber is lifted high by means of the lifting device 11. A freshly vulcanized tire 76 is about to be grasped by a tire removing mechanism including an actuating cylinder 53 hinged on a bracket 52 on the column 14. The associated piston rod 54 is attached by pins 55, 58 and a link 56 to two parallel rods 57 of which only one is seen in FIG. 3.

The ends of the pin 58 are journaled in a bracket 59 carrying rollers 60 retained in guide ways 61 of the column 14.

An actuating cylinder 62 is hingedly fastened to the bracket 59, and the associated piston rod is attached to a pivot pin 63 on an arm 64 pivotally attached to the bracket 59 by a shaft 65. Rods 66 shorter than the rods 57 are fastened to the pin 63 and to a tire removing fork 69 by a pivot pin 67. The rods 57 are hingedly fastened to the fork 69 by a pin 68. The fork 69 is provided with rollers 70.

A link 71 hingedly connects the pin 68 with a pivot pin 72 on a conveyor frame 73. The frame carries rollers 74 and is pivotally attached to the aforementioned bracket 38 by a pin 75. The conveyor and associated elements were omitted from FIG. 2 for the sake of clarity.

A stabilized tire 51 is being stripped by the abutments 37 from the discs 6, 33 while the disc 33 is being withdrawn from the disc 6 by the actuator 15. A lock 77 on the movable disc 33 permits the same to be attached to the disc 6.

FIGS. 4 and 5 respectively illustrate the transfer of a vulcanized tire from the mold to the stabilizing device and the charging of the mold, as will hereinafter be described in more detail. In addition to the structural elements described above, they also show the vulcanizing diaphragm 78.

The aforedescribed apparatus is operated as follows:

The turntable 5 is indexed by a non-illustrated drive, being at rest when each of the vulcanizing chambers is in the position A (FIG. 1) at the operating station, and the foot 30 of the lowered lifting device 11 engages the shoe 10 on the top portion 1 of the chamber. The turntable 5 stands still while the bayonet closure 2 is opened by the actuator 4, the top section 1 is lifted from the bottom section 49, the vulcanized tire 76 is removed from the chamber, an uncured tire assembly 29 is charged in the chamber, the upper section 1 is lowered, whereby the tire assembly is spread in the mold, and the bayonet closure 2 is closed by the actuator 4. The turntable 5 is then indexed one step, and the freshly charged chamber moves into position B while another chamber enclosing a vulcanized tire moves from position J into position A.

Steam is supplied to the freshly charged chamber from the distribution system 8 through the tubes 9, and hot water under pressure is similarly fed to the diaphragm 78. The tire in the chamber is vulcanized by the resulting heat and pressure while the chamber moves stepwise through positions B to J. When the chamber reaches position J, steam and water under pressure are released, and the tire 76 is removed from the chamber during subsequent opening of the vulcanizing chamber at the operating station, as described above. The freshly vulcanized tire is transferred to the stabilizing device and held between the discs 6, 33 during the subsequent revolution of the turntable while being inflated by compressed air supplied by the tubes 9 to the fixed disc 6. The desired air pressure is maintained by non-illustrated manostats, and is released when the stabilized tire reaches the position J. When the deflated tire reaches position A, the disc 33 is withdrawn, as shown in FIGS. 3 and 4, and the tire may be rolled away from the illustrated apparatus.

FIG. 2 illustrates the removal of an uncured tire assembly 29 from a conveyor hook 28 while the same moves in the direction of the arrow. When not set for receiving an assembly 29, the plate 20 is held horizontal with its chuck 21 directed downward so that the space above the arm 18 is free for passage of unneeded assemblies 29 past the vulcanizing apparatus. When the plate 20 is tilted into the position shown in FIG. 2 by the cylinder 25, the next assembly 29 is deposited by the carrying hook 28 on the chuck jaws 21, the jaws are moved apart by the cylinder 22 to secure the assembly 29, and the plate 20 is tilted 90° counterclockwise from the illustrated position.

FIG. 3 shows the chamber top section 1 in its raised position. The cylinder 44 has swung the lever 45 counterclockwise from the position of FIG. 2, thereby raising the diaphragm mechanism 48 and stripping the vulcanized tire 76 from the lower mold portion in the bottom section 49 of the vulcanizing chamber.

The tire removing fork 69 is normally retracted in the column 14. When the cylinder 53 expels its piston rod 54, the fork 69 is moved into the illustrated position between the tire 76 and the bottom section 49 of the vulcanizing chamber, while the bracket 59 remains in the illustrated position. The movement of the link 56 by the piston rod 54 is limited by a non-illustrated stop which releases the bracket 59 when engaged by the link 56, so that the bracket thereafter is moved along the guideways 61 by the cylinder 53.

While the fork 69 is moved into the illustrated operative position, the normally retracted conveyor frame 73 is pivoted on the pin 75 out of the column 14 toward the chamber bottom section 49.

Simultaneously with the stripping of the vulcanized tire 76 from the bottom portion 49, the slide 34 is moved by the actuator 15 toward the disc 33, and the coupling 35 is engaged with the disc when the same is turned slightly by a non-illustrated cylinder while the lock 77 is being opened to release the disc 33 from the disc 6. When the disc 33 thereafter is withdrawn from the disc 6, as shown in FIG. 3, the previously stabilized tire may be removed.

When the piston rod 54 is expelled further from the cylinder 53, the fork 69 lifts the vulcanized tire 76 free of the mold, as shown in FIG. 4 which shows the ultimate position of the fork 69, whereby the diaphragm 78 is withdrawn from the tire, the diaphragm having been deflated and stretched by the diaphragm mechanism 48 in a manner not illustrated in detail. The bracket 59 reaches the upper end of the guideways 61.

The fork 69 is then pivoted on the pin 68 by the cylinder 62 until the fork 69 and the conveyor frame 73 form a continuous track equipped with rollers 70, 74 on which the vulcanized tire 76 moves into the space between the discs 6 and 33 where it is centered relative to the discs by non-illustrated stops. The fork 69 thereafter is retracted into the column 14, and the disc 33 is inserted into the vulcanized tire 76 by the actuator 15.

It is ultimately disengaged from the coupling 35 and attached to the disc 6 by the lock 77 when the disc 33 is turned slightly by the aforementioned non-illustrated cylinder. The slide 34 is then retracted.

The cylinder 23 thereafter is energized to swing the bar 17 with the tire assembly 29 suspended therefrom as described with reference to FIG. 2 into the unoccupied space between the chamber sections 1, 49. When the tire assembly 29 is vertically aligned with the diaphragm 78, the arm 18 is lowered by the cylinder 26, and the chuck jaws 21 release the uncured tire assembly. They are thereafter raised clear and swung back to the position seen in FIG. 2 for receiving another assembly 29 from a conveyor hook 28.

The lifting device 11 then lowers the top section 1 while steam introduced into the diaphragm 78 causes the tire assembly 29 to be spread. After the top section has been driven home on the bottom section 49 by the lifting device 11, the bayonet-type closure 4 is engaged, and the turntable 5 is indexed one step by its non-illustrated conventional drive.

We claim:

1. In a vulctanizing apparatus, in combination:
   (a) turntable means mounted for rotation about a vertically extending axis;
   (b) a plurality of vulcanizing chambers peripherally mounted on said turntable means for rotation therewith, each chamber having a bottom section fixedly fastened to said turntable means, a top portion, and releasable closure means for fastening said portions to each other;

(c) mold means in each chamber adapted to enclose an uncured tire assembly and the vulcanized tire produced therefrom;

(d) vulcanizing means on said turntable means for heating said tire assembly in each mold means under pressure;

(e) a stationary support adjacent the circumference of said turntable means;

(f) lifting means on said support for lifting the top section of each vulcanizing chamber from the associated bottom section when the chamber is in a position adjacent said support during rotation of said turntable means;

(g) tire removing means on said support for removing a vulcanized tire from said vulcanizing chamber in said position thereof;

(h) stabilizing means mounted on said turntable and associated with each of said chambers for stabilizing the removed vulcanized tire, said stabilizing means including two disc members movable toward and away from each other and adapted to receive said removed tire therebetween;

(i) actuating means on said support for moving said disc members relative to each other in said position of each vulcanizing chamber; and (j) locking means for locking said disc members to each other.

2. In an apparatus as set forth in claim 1, conveying means responsive to removal of a vulcanized tire from said vulcanizing chamber for conveying the removed tire from said removing means to said stabilizing means.

3. In an apparatus as set forth in claim 1, charging means on said support for receiving an uncured tire assembly and for inserting the same in said mold means when said top section is lifted from said bottom section in said position of each vulcanizing chamber.

4. In an apparatus as set forth in claim 3, said charging means including chuck means for withdrawing said assembly from a conveyor and for retaining the withdrawn assembly, and moving means for moving said chuck means toward said mold means and for releasing the retained assembly from said chuck means to said mold means.

5. In an apparatus as set forth in claim 4, said moving means including a carrier member mounted on said support for rotation about a vertically extending axis, an arm member extending from said carrier member radially relative to the axis of the same, and a plate member tiltably mounted on said arm member, said chuck means being mounted on said plate member.

6. In an apparatus as set forth in claim 1, said vulcanizing means including a vulcanizing diaphragm of substantially cylindrical shape having two ends, one of said ends being fastened to said bottom section, and means for raising and lowering the other end of said diaphragm.

7. In an apparatus as set forth in claim 1, said tire removing means including a tire removing member and operating means for moving said tire removing member between a retracted position adjacent said support, an operative position, and an ultimate position, said tire removing member in said operative position being interposed between a vulcanzed tire and said bottom section, said mold means including stripping means for lifting said tire from said bottom section, and said tire being released from said stripping means and supported on said tire removing member in said ultimate position of the latter.

8. In an apparatus as set forth in claim 7, said tire removing member being fork-shaped, and said operating means including a bracket, guide means on said support for guiding said bracket in a vertically extending path, two longer rod members having each respective ends pivotally fastened to said bracket and to said tire removing member, two links hingedly fastened to said bracket, two shorter rod members having each respective ends pivotally fastened to a corresponding one of said links and to said tire removing member, actuating means for pivoting said longer rods on said bracket and for moving said bracket in said path thereof, and means for pivoting said links relative to said bracket.

References Cited

UNITED STATES PATENTS

| | | |
|---|---|---|
| 1,900,456 | 3/1933 | Mead. |
| 2,058,880 | 10/1936 | Hunt. |
| 2,672,652 | 3/1954 | Howe, et al. |
| 2,832,991 | 5/1958 | Soderquist. |
| 3,054,141 | 9/1962 | Hammesfahr. |
| 3,222,724 | 12/1965 | Soderquist. |
| 3,223,767 | 12/1965 | Harris. |

J. SPENCER OVERHOLSER, Primary Examiner

J. S. BROWN, Assistant Examiner

U.S. Cl. X.R.

18—20